United States Patent [19]

Anderson

[11] Patent Number: 4,688,430

[45] Date of Patent: Aug. 25, 1987

[54] DEVICE FOR IMAGING THREE DIMENSIONS WITH A SINGLE PULSE TRANSMISSION

[76] Inventor: Forrest L. Anderson, P.O. Box 1400, Bernalillo, N. Mex. 87004

[21] Appl. No.: 799,424

[22] Filed: Nov. 19, 1985

[51] Int. Cl.⁴ ............................................. G01N 29/04
[52] U.S. Cl. ......................................... 73/625; 73/626
[58] Field of Search .................. 73/625, 626, 603, 628, 73/606, 597; 128/660

[56] References Cited

U.S. PATENT DOCUMENTS

| Re. 30,397 | 9/1980 | King | 128/660 |
|---|---|---|---|
| 3,717,843 | 2/1973 | Farrah et al. | 73/603 |
| 3,918,025 | 11/1975 | Koskikawa et al. | |
| 4,131,022 | 12/1978 | Mezrich | 73/606 |
| 4,332,016 | 5/1982 | Berntsen | 73/628 |
| 4,395,909 | 8/1983 | Steinberg et al. | 73/606 |

OTHER PUBLICATIONS

S. Bennett et al., "A Real Time Synthetic Aperture Digital Imaging System" Acoustic Imaging, vol. 10-1982.
K. Liang et al., "A Three Dimensional Synthetic Focus System" Acoustic Imaging, vol. 10-1982.
P. Curl et al., "A Digital Synthetic Focus Acoustic Imaging System" Acoustic Imaging, vol. 8-1980.
R. Koppelman et al., "Three Dimensional Acoustic Imaging" Acoustic Imaging, vol. 8-1980.
B. Hildebrand "An Analysis of Pulsed Ultrasonic Arrays" Acoustic Imaging, vol. 8-1980.
K. Liang "A 50 MHz Synthetic Focus System" Acoustic Imaging, vol. 11-1982.
G. Sackman et al., "Acoustic Imaging in Marine Sediment . . . " Acoustic Imaging, vol. 11.

*Primary Examiner*—Anthony V. Ciarlante

[57] ABSTRACT

A method and apparatus for three dimensional imaging of a solid angular volume utilizing a single pulse of radiated energy is described. An embodiment is disclosed which utilizes a single monopolar acoustic pulse to insonify a three dimensional volume. An array of transducers is used to collect the echoes which are stored in a memory as a replica of the reflected three dimensional wavefield. This data is processed to form a replica of the three dimensional volume of objects responsible for the echoes which is then stored in a second three dimensional memory. The data in this memory is collapsed in the direction of preferred perspective to enable viewing on a cathode ray tube.

12 Claims, 10 Drawing Figures

SIMPLIFIED ECHO BUFFER MEMORY
ELEMENT 1
ECHO DATA
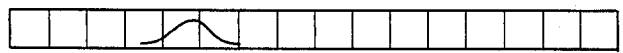
ELEMENT 2
ECHO DATA
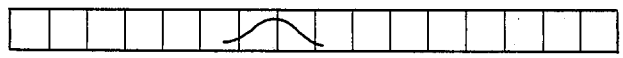
ELEMENT 3
ECHO DATA
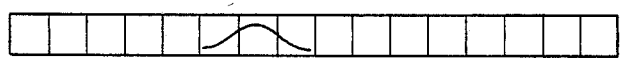
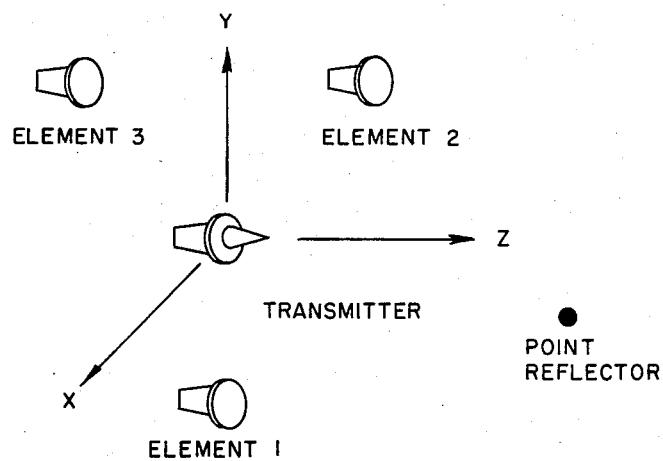
FIG-2

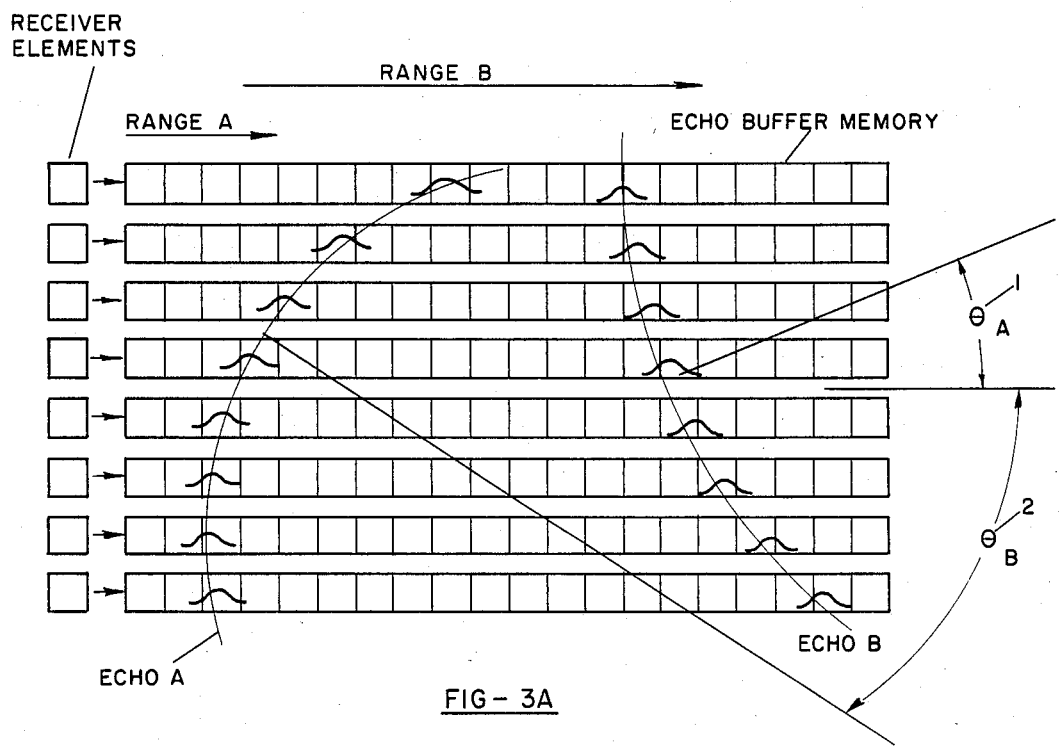
FIG-3A
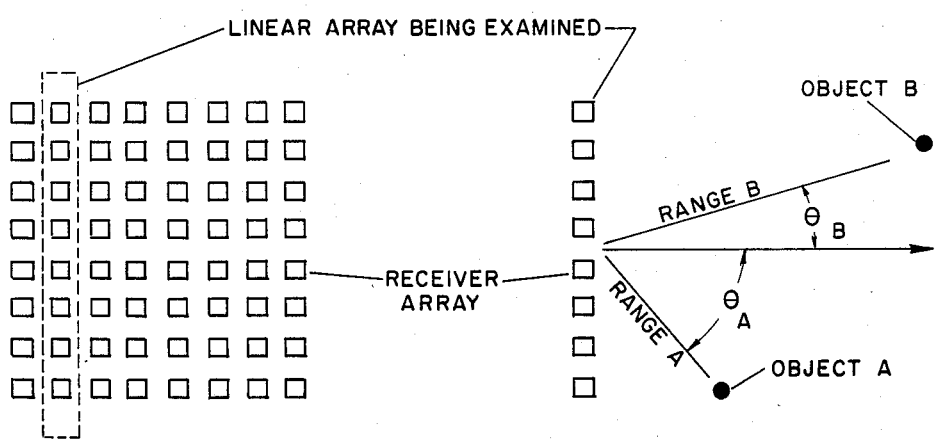
FIG-3B
FIG-3C

MULTICYCLE PULSES —
CONVERSION TO UNIPOLAR
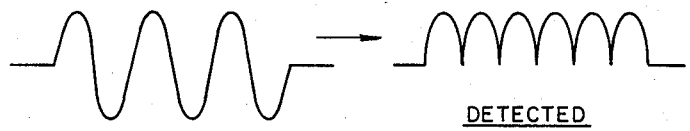
MULTICYCLE PULSE     DETECTED
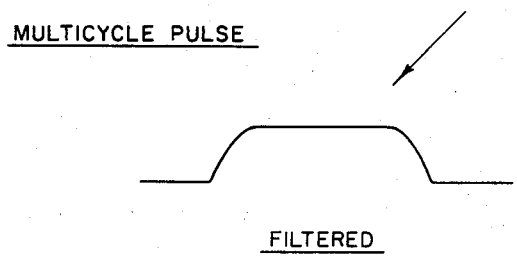
FILTERED
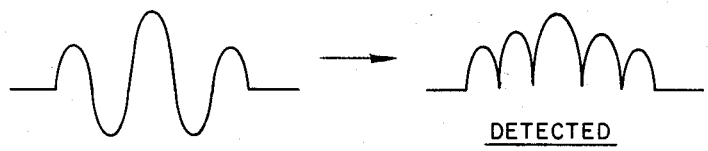
MULTICYCLE PULSE     DETECTED
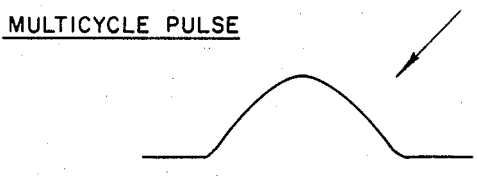
FILTERED
FIG—6

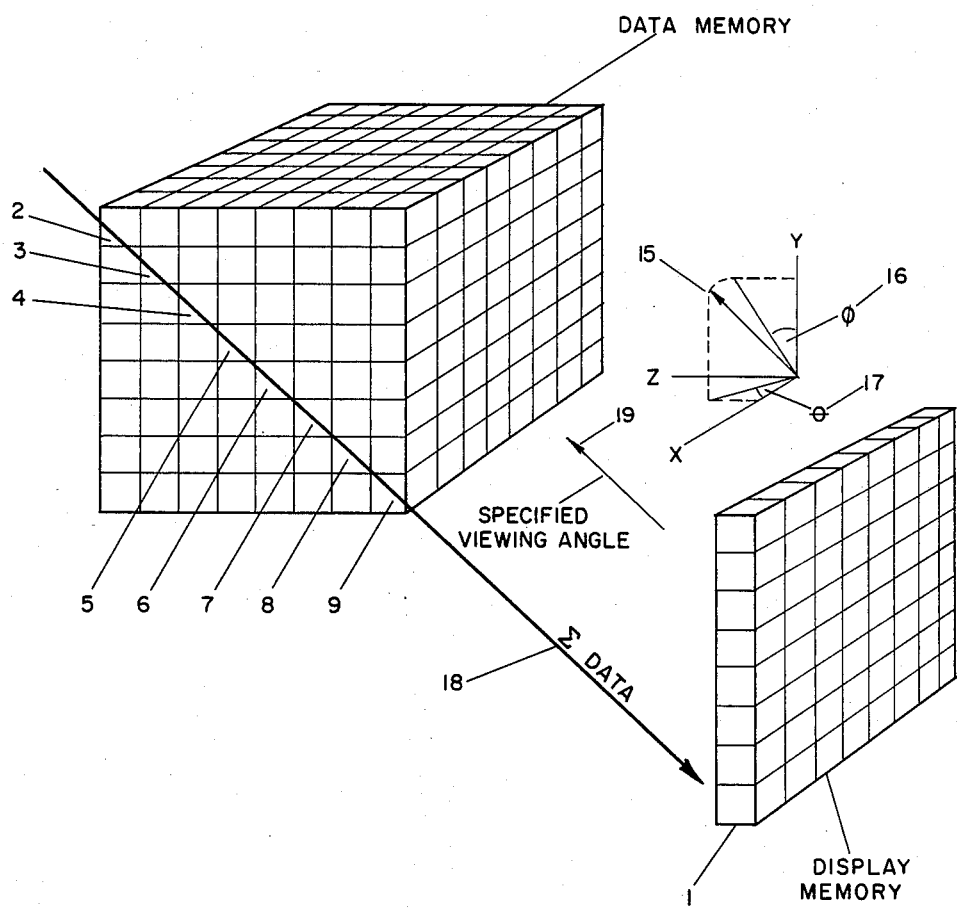
FIG—7

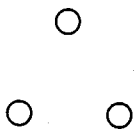
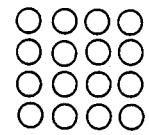
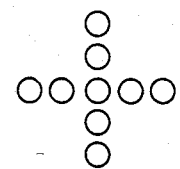
FIG-8A        FIG-8B        FIG-8C
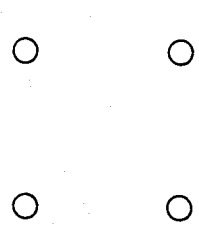
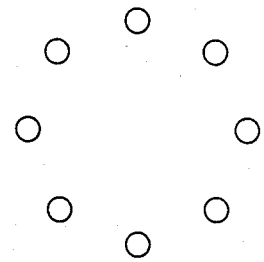
FIG-8D        FIG-8E

DEVICE FOR IMAGING THREE DIMENSIONS WITH A SINGLE PULSE TRANSMISSION

CROSS-REFERENCES TO RELATED APPLICATIONS

A related application is Ser. No. 06/858/696, filed May 2, 1986.

BACKGROUND OF THE INVENTION

1. Field Of The Invention

This invention relates to the three dimensional imaging of objects using radiated pulses of energy.

2. Description Of The Prior Art

Heretofore imaging of three dimensional volumes was accomplished using multiple sequentially transmitted pulses. Each transmission and its associated echoes yields information on only a small portion of the volume. Thus it would take a relatively long time to image a three dimensional volume of significant spatial extent.

U.S. Pat. No. 4,332,016 describes an ultrasonic device for three dimensional imaging of objects using a narrow beam of insonification formed by a transmitted pulse. The objects to be imaged are mechanically moved past the beam and insonified repeatedly with transmitted pulses thus taking a relatively long time to form a complete image and in addition requiring a plurality of transmitting transducers.

U.S. Pat. No. 3,918,025 describes an ultrasonic device for three dimensional imaging using a frequency swept pulse of ultrasonic energy. However because of a frequency swept transmission the echoes from the object field will exhibit many diffraction effects that will vary as a function of their angular position. By means of the frequency sweep this device essentially electronically scans a continuous fan shaped beam over a field of objects and thus does not insonify the object field simultaneously with a single transmitted pulse and thus requires a longer time to obtain a three dimensional image.

U.S. Pat. No. Re. 30,397 describes an ultrasonic device for three dimensional imaging using a two dimensional real time scanner physically scanned in directions orthogonal to its tomographic plane and thus require a relatively long time to obtain a three dimensional image.

U.S. Pat. No. 4,131,022 describes an ultrasonic device for three dimensional imaging. However this device uses a scanned beam of ultrasonic energy and requires a longer time to completely image a volume.

SUMMARY

This invention, by transmitting particularly shaped pulses, can reconstruct an image using a very sparse array without grating lobes. By also having the pulses propagate through a wide solid angle, echo information from a three dimensional volume can be received and stored after the transmission of a single pulse. The echo information can be processed by a parallel processor in real time to reconstruct an image of the three dimensional volume. This makes it possible to image three dimensions in real time using very sparse receiver arrays.

Therefore it is an object of this invention to provide three dimensional imaging with a single pulse of energy.

It is another object to be able to use a sparse array of receiver elements to receive echoes unambiguously from a three dimensional field of objects.

It is still another object to image a three dimensional volume in real time and to avoid grating lobes and other diffraction effects when using a sparse array of receiver elements.

BRIEF DESCRIPTION OF THE DRAWING

FIG. 2 shows the form of the echo data recorded in a simplified echo buffer memory when the echoes are caused by a single point reflector.

FIGS. 3a–c show the forms of the echoes recorded in a portion of a more complex echo buffer memory when the echoes are caused by two point reflectors.

FIG. 6 illustrates the conversion of multicycle pulses to unipolar pulses.

FIG. 7 shows a simplified data memory and display memory to illustrate the processing required for perspective viewing of three dimensional data on a two dimensional display.

FIG. 8 shows some of the various possible receiver array configurations.

DESCRIPTION OF THE PREFERRED EMBODIMENT

Figure 1:
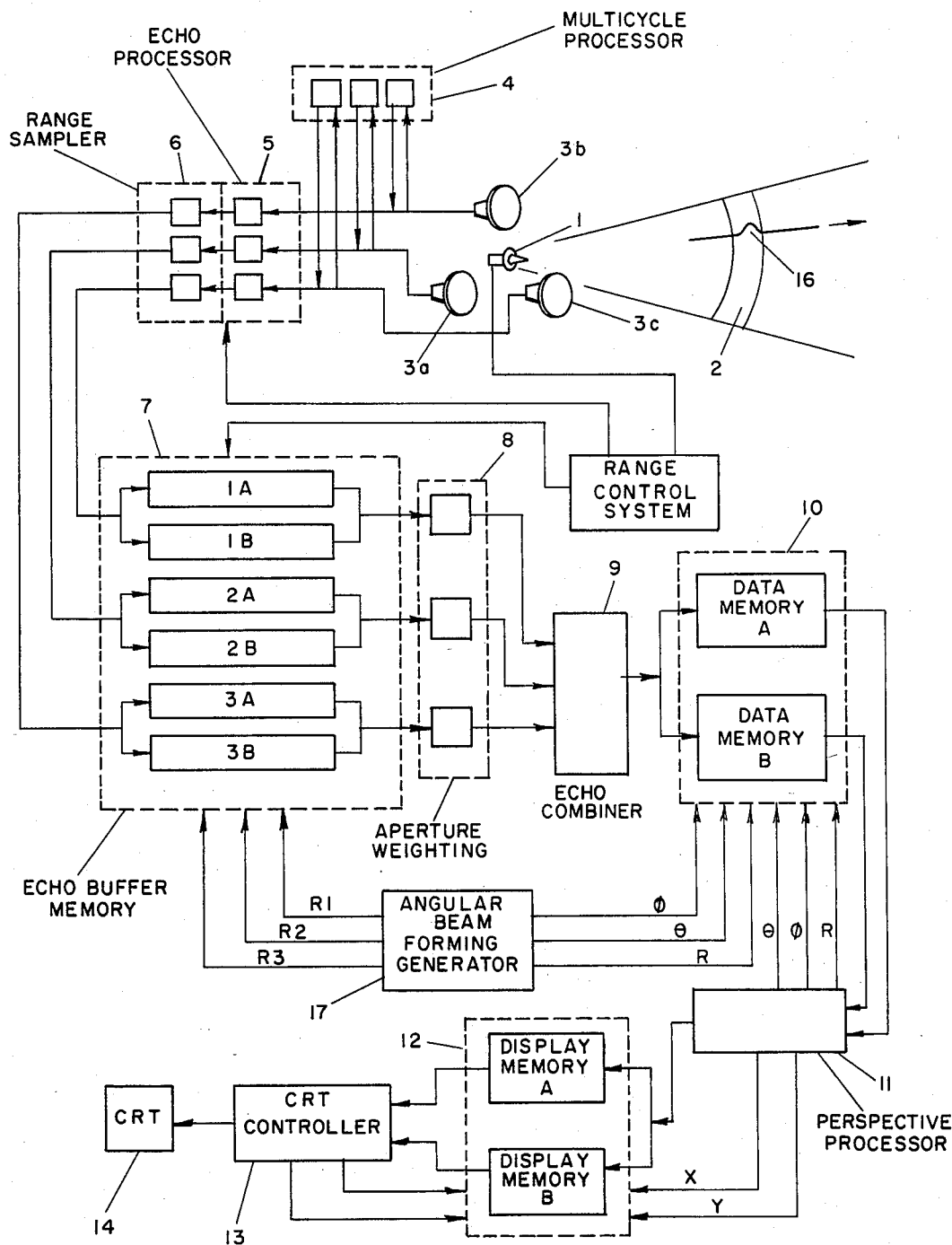
FIG. 1 is a diagram of a simplified version of the invention using only three receiver elements.

The apparatus described herein is a means of imaging three dimensions with the transmission of a single acoustic pulse of energy. In this manner the image can be formed and updated much faster than images with multiple acoustic transmissions.

This means of imaging uses a single cycle (FIG. 5-8 through 14), unipolar (FIG. 5-4,5,6) or wide angle multicycle (FIG. 5-8 through 14) uniformly. A planar or three dimensional array of receiver elements (FIG. 8) is used to detect echoes caused by objects, at different ranges and two dimensional angular directions, in the path of the single acoustic transmission. A receiver array with sparsely spaced elements (FIG. 8) may be used if the acoustic transmission is a single or unipolar pulse since no grating lobes will occur. Sparsely spaced elements may also be used with a multicylce pulse by detecting and filtering the echoes at the receiver elements outputs before further processing occurs (FIG. 6).

The two dimensional angular direction of a given point reflector or object may be determined by measuring the differences in times that the echo reaches each of the elements of the receive array. The point reflectors or objects distance from the receiver is determined by the echoes time of flight.

The problem of specular reflection is relieved by using the unipolar pulse. A surface inclined to the direction of propagation of the acoustic pulse will generate a reflection pattern similar to the angular radiation patterns shown in FIG. 5. It can be seen that acoustic energy is reflected in various directions more uniformly than with a multicycle pulse.

Although several means could be used to determine the two dimensional angular direction of the echoes, this embodiment uses the delay and sum techniques which can be used for both angular direction determination and focusing. As an alternative to summing the echoes may be multiplicatively combined or a combination of additive and multiplicative combination may be used. Various types of dynamic range compression can be used before additive combination which would provide the equivalent of a combination of additive and multiplicative processing.

If the echoes dynamic range was not compressed before combination then it should be compressed after combination to reduce the size of the memory elements required in the machine and to match the dynamic range of the display.

Once the echoes have been sampled and segregated as to range by measuring the time of flight and combined to resolve the various angular directions many different means could be used to present the reconstructed objects causing echoes on the output display. The preferred embodiment uses two separate memories, the data memory (FIG. 1-10) and the display memory (FIG. 1-12). This allows maximum flexibility in viewing the processed echo data.

The individual memory elements in the data memory correspond to each of the individual ranges and two dimensional angular directions of the sampled and combined echoes. The data memory then represents the three dimensional solid angular volume originally insonified by the transmitted pulse. The display memories memory elements correspond to the pixels that will be displayed on a two dimensional display, in this embodiment, a cathode ray tube (CRT).

The perspective processor (FIG. 1-11) is responsible for processing the echo data contained in the data memory into the form that will be displayed on the CRT. The perspective processor can select a two dimensional plane from any location and orientation on the CRT (FIG. 1-14). This gives a tomographic image with user selectable tomogram orientation and position.

The perspective processor can also display three dimensional data on the two dimensional CRT as a view through a translucent volume (FIG. 7) when the objects in the viewing volume are not opaque with respect to the insonification. The perspective processor creates volumetric views by first defining the volume of data in data memory which has been selected by the user. This may include the complete volume of three dimensional data represented by data memory. It then collapses the data in the direction of the viewing perspective (FIG. 7) specified by the user. The collapsing of the data is done in the following manner. The perspective processor assigns multiplicative weighting to the data in the direction of the specified perspective (FIG. 7). It does this in such a way that the data in the back, with respect to the selected perspective, of the volume which is the background is weighted with a smaller number than the data in the foreground. It then sums up the weighted data (FIG. 7-2 through 11) that will underlay a given pixel on the CRT (FIG. 7-1) and places it in the proper location in the display memory. This is repeated for each pixel location in display memory.

Thus the volumetric data in data memory is weighted and mathematically integrated in the perspective direction selected by the user and then displayed on the CRT.

DETAILED DESCRIPTION

FIG. 1 shows a simplified version of the preferred embodiment to facilitate understanding of the structure of the machine. Only three elements are used in the receiver array (FIG. 1-2). The number and placement of the receiver elements has an effect on the equivalent receiver sidelobe level and its sensitivity.

The transmitter element (FIG. 1-1) consists of a low Q, wideband piezoelectric material which will closely reproduce the electrical signal applied to it converting the electrical waveform to a similar acoustic waveform. The range control system (FIG. 1-15) applies a unipolar electrical signal to the transmitter element which causes a unipolar acoustic pulse (FIG. 1-16) to propagate down the solid angle determined by the transmitters angular radiation pattern. As the propagating pulse encounters objects in its path echoes are generated which propagate back toward the receiver elements (FIG. 1-3a,3b,3c).

A range clock oscillator is enabled at the time of transmission. Each range clock generator pulse increments a range address counter, the binary state of which indicates the range of the objects responsible for the echoes currently being detected at the receiver elements. This binary state provides the memory addresses for the echo buffer memory (FIG. 1-7). Each of the receiver elements outputs are filtered, amplified as a function of time of flight to compensate for attenuation, and compressed in dynamic range by the echo processor (FIG. 1-5).

If multicycle pulses are used the echoes are detected and then filtered. The outputs are then digitized by an A/D converter upon each range clock oscillator pulse and written into echo buffer memory at the address specified by the range address counter. This process continues until echoes have been received and stored out to the maximum range of interest. At this time the buffer memory will contain a time history for each receiver element of the echoes generated by the transmitted pulse. This represents a sampled replica of the three dimensional wavefield generated by the echoes of the insonified objects being imaged and may be considered a three dimensional hologram.

The echo buffer memory consists of two alternating memories, memory A and memory B (FIG. 1-7). While one memory is receiving current echo data the other memory is transferring the previous echo data to the echo combiner (FIG. 1-9). The echo buffer memory size depends on the number of range samples desired, the compressed dynamic range of the echo samples and the number of receiver elements in the receiver array. Only three elements are shown in FIG. 1. Aperture weighting (FIG. 1-8) multiplies each of the elements echoes by a number which represents a portion of an aperture weighting function used to further modify the receiver radiation pattern. This is unimportant if only three elements are used but could be used to advantage with a larger array.

The echoes are transferred from the echo buffer memory (FIG. 1-7) by the angular beam forming generator (FIG. 1-17) which selects the appropriate echoes to combine for each range increment and angular direction (FIG. 2). FIG. 3a shows a linear array of elements that comprise a portion of a two dimensional planar receiver array used here to better illustrate the process of angular beam formation. Next to the elements are shown the corresponding echo buffer memories.

FIG. 3b shows the planar array from which the linear array of elements was extracted. FIG. 3c shows an edge view of the array with two point reflectors positioned in front of it. Shown in the echo buffer memory (FIG. 3a) is the data pattern caused by the objects a and b after a single pulse transmission and reception. The effects of varying range and wavefront curvature are evident. The effects of the different angular directions of the point reflectors are also evident.

Figure 4:
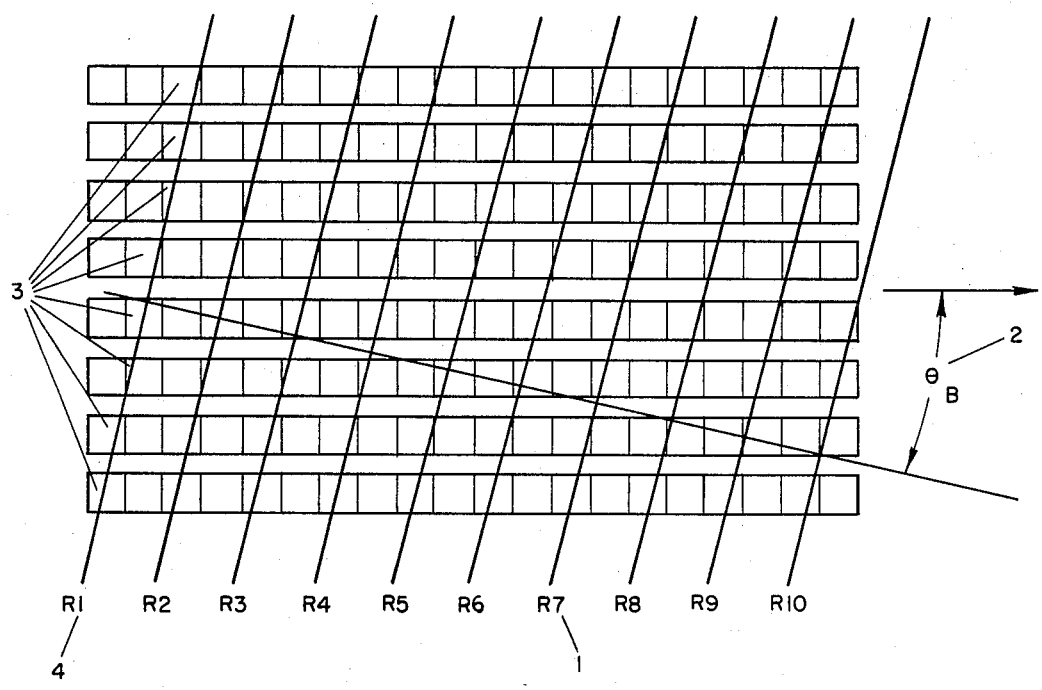
FIG. 4 illustrates the manner in which receiver beam forming takes place in the echo buffer memory.
Figure 5:
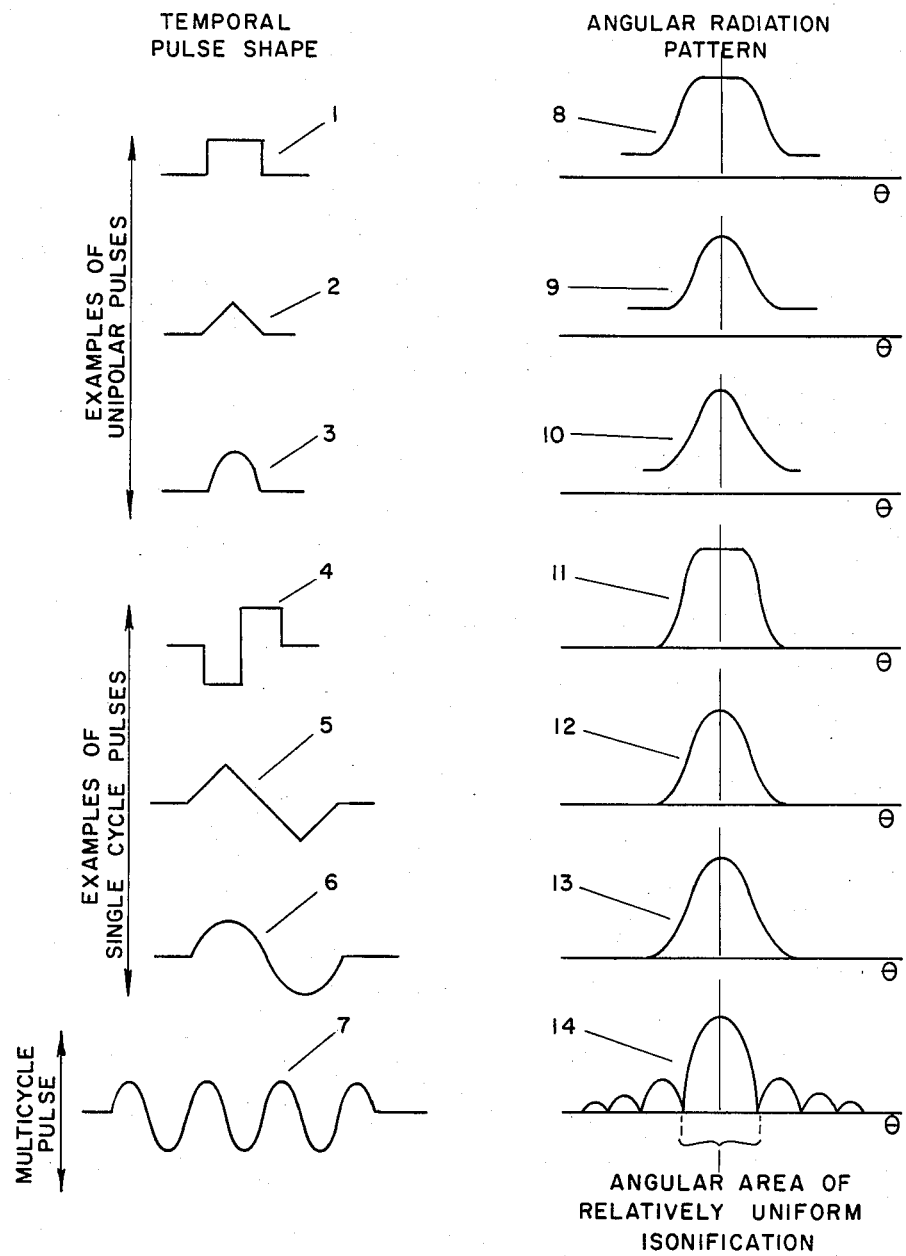
FIG. 5 illustrates the various types of pulses that may be used by the transmitter and the beam patterns of each pulse.

The beam forming generator (FIG. 1-17) forms the image of the point reflectors residing along a positional vector in the angular direction 8b (FIG. 3a-2), which is a one dimensional version of the two dimensional angular direction, as follows. Refer to FIG. 4. Wavefront curvature is neglected to facilitate understanding of the beamforming process. R1 through R14 (FIG. 4-1) are the range increments in the 8b direction (FIG. 4-2). For a point reflector at range R1 (FIG. 4-4), given the angular direction, the angular beam forming generator (FIG. 1-17) determines the memory locations (FIG. 4-3) in the echo buffer memory where the echo data should reside. It then extracts the data and combines it in the echo combiner (FIG. 1-9). It places the results in the appropriate location in the three dimensional data memory (FIG. 1-10). It repeats this process for all range increments lying along the vector in the 8b direction (FIG. 4-2). When it has finished it has formed a beam of reception in the 8b direction. This is repeated for each angular direction to be resolved in the insonified solid angular volume.

In this manner the sampled wavefield replica contained in echo buffer memory is processed to form an image of the original object field. The result is a three dimensional image of the insonified objects which is contained in data memory (FIG. 1-10).

Each echo sample in echo buffer memory is then used a multitude of times. The number of times will be proportional to the number of angular directions to be resolved. The data memory (FIG. 1-10) is composed of two alternating random access memories whose size depends on the dynamic range of the processed echoes, the number of angular directions to be resolved and the number of range samples required. While data is being written into one memory it is being read out of the other by the perspective processor (FIG. 1-11). Since data in data memory represents a three dimensional image of the insonified volume the perspective processor extracts data from the data memory and processes it into a form suitable for two dimensional display on a CRT.

Tomograms at various ranges and orientations may be displayed. When this is done the perspective processor computes the addresses of the required data utilizing the user selected range and orientation information. Three dimensional data may also be displayed on the CRT. The user will select the boundaries of the volume and the orientation from which he wishes to view the volume. The perspective processor will then collapse the three dimensional data contained in the data memory, within the user selected boundaries, in the direction of the user selected orientation (FIG. 7-19).

For each pixel location in display memory (FIG. 7-1) the perspective processor will determine the sequence of addresses in data memory (FIG. 7-2 through 11) that contain three dimensional data which will be weighted and summed to form the pixel values. It will then proceed with the weighted summation and place the results in the appropriate location in the display memory (FIG. 7-13). The perspective processor determines the viewing vector (FIG. 7-15) from the perspective orientation requested by the user. It uses the angles $\phi$ (FIG. 7-16) and $\theta$ (FIG. 7-17), which define two dimensional angular direction, to compute an address vector (FIG. 7-18 through the data memory (FIG. 7-14) for each particular pixel location (FIG. 7-1) in display memory (FIG. 7-13). It then applies a multiplicative weigting to each of the data contained in the addresses (FIG. 7-2 through 11) intersected by the address vector. This weighting enhances the foreground data (FIG. 7-7 through 11) more than the background data (FIG. 7-2 through 6) thus giving a range perspective in the CRT display. It then sums the data along the viewing vector thus performing an integration and places the results in the appropriate pixel location (FIG. 7-1) in display memory until a complete two dimensional image of the three dimensional data is formed.

The display memory (FIG. 1-12) is composed of two alternating random access memories. While one is being updated by the perspective processor the other is being used by the CRT controller (FIG. 1-13) to form the video singals required by the CRT. The CRT controller generates the horizontal and vertical sync pulses and combines these with the data extracted from display memory to create the CRT input signal.

While the above description contains many specifics, these should not be construed as limitations on the scope of the invention, but rather as an example of one preferred embodiment. For example, the preferred embodiment uses an acoustic pulse which is one type of radiated mechanical energy which, in general, includes all types of vibrations within matter. Some other examples are: siesmological sounding pulses caused by explosions or impact of instruments on the earths surface, underwater sonar pulses, medical ultrasound pulses, acoustic pulses in the air, and vibrational pulses in solid materials such as are used in nondestructive testing.

The invention could be implemented with other forms of energy such as electromagnetic waves. Some examples of which are radar pulses, xrays, and light pulses. The implementation would be analogous to the acoustic implementation with the timing circuits adjusted for the different velocity of propagation and with electromagnetic receivers and transmitters used instead of their acoustic counterparts.

In general, embodiments of the invention using different forms of wave energy are analogous to each other, differing in circuit timing and types of transmitters and receivers. The transmitters and receivers would typically be commonly available types of components.

What is claimed is:

1. A means for creating an image of a three dimensional volume containing objects at different ranges and two dimensional angular directions utilizing a device comprising:
   (a) A means for generating a single monopolar, single cycle, or wide angle multicycle pulse of energy which will radiate through a wide angular volume uniformly,
   (b) A means for detecting echoes caused by objects, at different ranges and two dimensional angular directions in the path of propagation of said single pulse, having a plurality of sparsely spaced receiver elements,
   (c) A means for sampling said echoes as a function of time at each of said receiver elements so as to segregate said echo samples in order of the ranges of the points on objects causing said echoes from said single pulse,
   (d) A means for storing said echo samples from each of said receiver elements so as to create a time history of echoes resulting from said single pulse for each of said receiver elements, (e) A means for selecting said samples from said time history memories and combining them so as to form an image of points on objects residing at different ranges along each two dimensional angular direction within said wide angular volume, comprising:
- (aa) A means for determining and selecting the time history memory location where echo samples should reside for each point, thus generating selected samples for each point at each different range, given a particular two dimensional angular direction,
- (bb) A means of combining said selected samples to form an image of said points at different ranges along a particular angular direction,
- (cc) A means of generating a different angular direction along which different points will reside and forming images of said different points as in (aa) and (bb),
- (dd) A means of repeating (cc) for each angular direction in said three dimensional volume until images of all possible points making up objects in said three dimensional volume have been formed.

2. A means for creating an image of a three dimensional volume containing objects at different ranges and two dimensional angular directions utilizing a device comprising:
- (a) A means for generating a single monopolar, single cycle, or wide angle multicycle pulse of energy which will radiate through a wide angular volume uniformly,
- (b) A means for detecting echoes caused by objects, at different ranges and two dimensional angular directions in the path of propagation of said single pulse, having a plurality of sparsely spaced receiver elements,
- (c) A means for sampling said echoes as a function of time at each of said receiver elements so as to form a time sequence of echo samples from each receiver element,
- (d) A means for storing said echo samples from each of said receiver elements so as to create a time history of echoes, resulting from points on objects in the path of said single pulse, for each of said receiver elements,
- (e) A means for selecting said samples from said time history memories and combining them so as to form an image of objects residing at different ranges along each angular direction within said wide angular volume, comprising:
  - (aa) A means for determining the time history memory locations, for each receiver element, where samples should reside, thus generating a group of selected samples for each point on each object at each different range, given a particular angular direction,
  - (bb) A means of combining by addition, multiplication or a combination of addition and multiplication each of said groups of selected samples to form an image of said point reflectors at different ranges along a particular angular direction,
  - (cc) A means of generating a different angular direction along which different point reflectors will reside and forming images of said different point reflectors as in (aa) and (bb),
  - (dd) A means of repeating step (cc) simultaneously for each angular direction in said three dimensional volume so that images of all possible point reflectors in said three dimensional volume have been formed.

3. The device according to claim 1 or 2 wherein there is provided a means for repeatedly generating said single pulse while repeating the image forming steps described in claim 1 or 2 after the generation of each single pulse so as to provide a repeatedly updated image of said objects in said three dimensional volume.

4. The device according to claim 1 or 2 wherein there is provided a means for viewing the three dimensional image of said objects on a two dimensional display.

5. The device according to claim 1 or 2 wherein the said images of said point reflectors are stored in a memory to form a stored three dimensional image of said objects in said three dimensional volume.

6. The device according to claim 5 wherein there is provided a means for processing the data of said memory along specified viewing perspective vectors to allow viewing of the three dimensional data on a two dimensional display from various viewing perspective directions.

7. The device according to claim 6 wherein there is provided a means for extracting a planar portion of data from said memory and displaying it on a two dimensional display as a tomogram which can be selected from various positions and orientations from within said memory.

8. The device according to claim 1 or 2 wherein the single pulse of energy is a monopolar pulse.

9. The device according to claim 1 or 2 wherein the single pulse of energy is a single cycle pulse.

10. The device according to claim 1 or 2 wherein there is provided a means for converting the single pulse of energy when it is a multicycle pulse to a monopolar pulse at each receiver element before further processing.

11. The device according to claim 1 or 2 wherein the single pulse of energy is mechanical.

12. The device according to claim 1 or 2 wherein the single pulse of energy is electromagnetic.

* * * * *